F. McR. BAWDEN.
TIRE TREAD.
APPLICATION FILED JAN. 13, 1912.
1,050,790.  Patented Jan. 21, 1913.
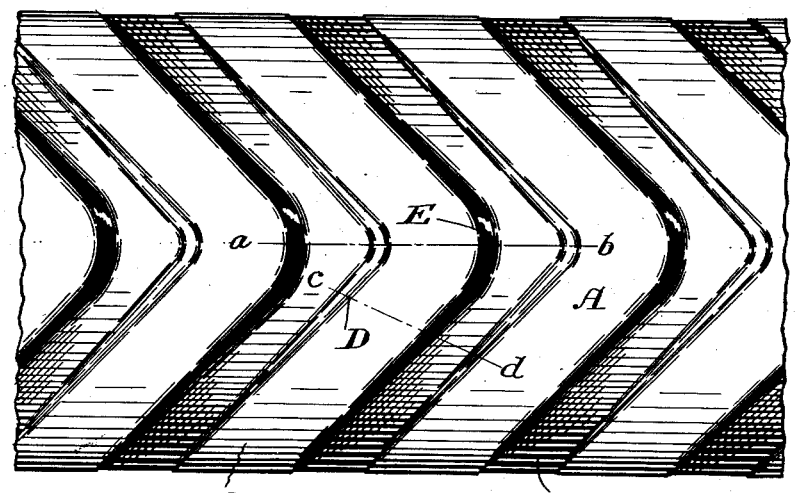
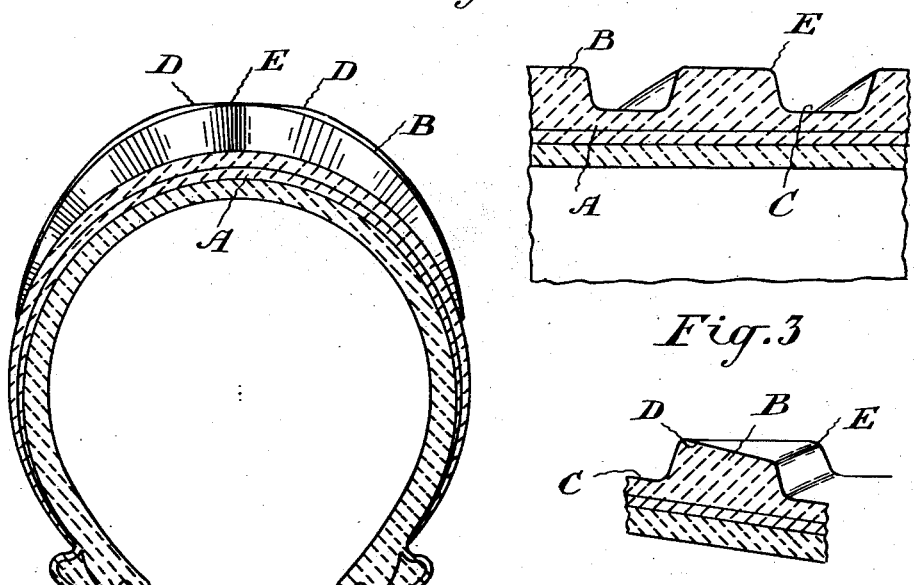
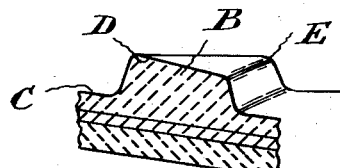
WITNESSES:
INVENTOR.
F. McR. Bawden
BY J. Edward Maybee
ATTORNEY.

UNITED STATES PATENT OFFICE.

FRED McREA BAWDEN, OF TORONTO, ONTARIO, CANADA.

TIRE-TREAD.

1,050,790.  Specification of Letters Patent.   Patented Jan. 21, 1913.

Application filed January 13, 1912. Serial No. 671,082.

*To all whom it may concern:*

Be it known that I, FRED McREA BAWDEN, of the city of Toronto, in the Province of Ontario, Canada, machinist, have invented certain new and useful Improvements in Tire-Treads, of which the following is a specification.

This invention relates particularly to the shaping of the treads of pneumatic tires and the like for the purpose of preventing skidding on so-called "greasy" roads, and my object is to so shape the tire that any skidding movement results in the scraping off of the greasy surface matter, enabling a part of the tire following that which has effected the scraping to grip on the cleaned road surface.

I attain my object by means of the construction hereinafter described and illustrated in the accompanying drawings, in which—

Figure 1 is a plan view of part of a tire cover constructed in accordance with my invention; Fig. 2 a cross section; Fig. 3 a longitudinal section of part of the tread portion of the cover on the line *a—b*, Fig. 1; and Fig. 4 a section on the line *c—d*, Fig. 1.

In the drawings, like letters of reference indicate corresponding parts in the different figures.

The cover A may be of any standard construction as far as its main features are concerned, my invention lying only in the construction and shaping of the tread portion thereof. The tread has formed thereon a series of inclined ribs B which not only incline relative to the direction of travel of the wheel but also away from the surface on which the wheel may be resting. These ribs are preferably substantially V-shaped in plan, the apex of the V lying in the median plane of the tire. As the main purpose in forming the ribs is to break the continuity of the tire surface in contact with the road, the spaces C between the ribs are preferably made narrower than the ribs themselves which leaves sufficient material in the ribs to give the tire good wearing qualities. The tread surfaces of the ribs preferably curve more sharply than the surfaces between them so that the ribs die out at the sides of the tire. The effect of this is that free clearance is provided for the lateral escape of mud scraped up by the ribs.

To avoid a series of bumps as the tire rotates with a wheel, it is necessary that a rib contact with the ground before the next preceding rib leaves the ground and that the radial distance from the center of the wheel axle to the part of a rib which first contacts with the ground shall be equal to the radial distance to the part of the adjacent rib which at that time is in contact with the ground. Hence on each rib the part D of the tread surface is made substantially level with the tread surface at the apex E of the next adjacent rib and the surface of the rib on the line *c—d* slopes down from the inner to the outer side of the V.

The points D on each rib, it will be seen, are overlapped by the apex of the next adjacent rib so that the effect of a substantially cylindrical continuous tread surface is given. The anti-skid effect of this tread arises from the fact that skidding is usually in a forward diagonal direction. Whether the wheel be traveling with the apex of the V's to the front or rear, it follows that when skidding takes place one edge of each V in contact with the ground is substantially at right angles to the direction of skidding. This edge cuts through the greasy surface dirt to the true road surface beneath and plows off the dirt which escapes laterally through the adjacent space, leaving a clean road surface on which following surfaces on the tire tread will grip. My tread is, therefore, entirely different in principle to all ordinary anti-skid treads which depend on studs or projections to penetrate the surface dirt, but which have no cleaning action similar to that described. On mud and macadam roads the tractive effect of the inclined ribs is much the same as the tractive effect of ordinary studs, projections or ribs and they do not plow out the surface as when skidding begins on asphalt roads.

What I claim as my invention is:—

1. A tread for pneumatic and similar tires provided with ribs inclined to the direction of travel of the tire and curving up away from a surface on which the tire may be supported, a portion of each rib at each side of the median plane of the tire being substantially of the same distance from the center of the axle of a wheel on which the tire is used as the center portion of the adjacent rib.

2. A tread for pneumatic and similar tires provided with V-shaped ribs having their apexes in the medium plane of the tire, the ribs curving up and away from a surface on which the tire may be supported, a portion of each rib at each side of the median plane of the tire being substantially of the same distance from the center of the axle of a wheel on which the tire is used as the center portion of the adjacent rib.

3. A tread for pneumatic and similar tires provided with V-shaped ribs having their apexes in the median plane of the tire, the ribs curving up and away from a surface on which the tire may be supported, a portion of each rib at each side of the median plane of the tire being substantially of the same distance from the center of the axle of a wheel on which the tire is used as the center portion of the adjacent rib, the apex of one rib overlapping said high lateral parts of the adjacent rib.

Toronto, this 10th day of January 1912.

FRED McREA BAWDEN.

Signed in the presence of—
D. S. TOVELL,
R. S. CHILTON, Jr.